(12) United States Patent
Schaefer et al.

(10) Patent No.: US 6,554,111 B2
(45) Date of Patent: Apr. 29, 2003

(54) METHOD FOR EMPTYING THE PRESSURE MEDIUM FROM A HYDRAULIC UNIT OF A HYDRAULIC BRAKE SYSTEM OF MOTOR VEHICLES

(75) Inventors: Ernst-Dieter Schaefer, Brackenheim (DE); Hans-Heinz Kauschke, Southeim (DE); Timo Zundel, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/931,058

(22) Filed: Aug. 17, 2001

(65) Prior Publication Data

US 2002/0134630 A1 Sep. 26, 2002

(30) Foreign Application Priority Data

Aug. 26, 2000 (DE) .......................... 100 42 008

(51) Int. Cl.$^7$ .......................... B60T 11/10; B60T 17/22
(52) U.S. Cl. .......................... 188/352; 141/65; 141/98; 303/116.4; 303/113.2; 303/119.1
(58) Field of Search .................. 188/352; 303/113.1, 303/116.1, 116.4, 191, 28–30, 119.2, 119.3, 113.2, 113.3, 119.1; 60/584, 453, 327; 141/1, 98, 65; 134/21

(56) References Cited

U.S. PATENT DOCUMENTS 2,295,539 A * 9/1942 Beach
4,842,107 A * 6/1989 Buchanan et al. .......... 188/352
5,335,406 A * 8/1994 Van Den Mosselaar
5,410,881 A * 5/1995 Ellis .......................... 60/584
5,497,864 A * 3/1996 Oien .......................... 188/352
5,653,316 A * 8/1997 Kane .......................... 188/352
5,762,318 A * 6/1998 Staib et al.
6,223,855 B1 * 5/2001 Lindner
6,302,167 B1 * 10/2001 Hollub .......................... 141/98

FOREIGN PATENT DOCUMENTS

| DE | 10042008 | * | 3/2002 |
| EP | 0586818 | * | 3/1994 |
| EP | 0602556 | * | 6/1994 |

\* cited by examiner

Primary Examiner—Douglas C. Butler
(74) Attorney, Agent, or Firm—Ronald E. Greigg

(57) ABSTRACT

A method of employing a hydraulic unit of a brake system containing brake lines extending between a master cylinder and wheel brakes and valves which are actuatable by exertion of magnetic force and which have removable electrical coils and when unactuated assume their blocking position, including the steps of removing coils from the valves; connecting the hydraulic unit, toward the master cylinder or the wheel brakes, to an air source of adequately high pressure; switching the valves to their open position by the exertion of magnetic force of a permanent magnet; positively displacing the pressure medium contained in the hydraulic unit from the air source by air and caught.

15 Claims, 3 Drawing Sheets

METHOD FOR EMPTYING THE PRESSURE MEDIUM FROM A HYDRAULIC UNIT OF A HYDRAULIC BRAKE SYSTEM OF MOTOR VEHICLES

BACKGROUND OF THE INVENTION

1. Field of the Invention

The invention relates to a method for emptying the pressure medium from a hydraulic unit of a hydraulic brake system of a motor vehicle.

2. Description of the Prior Art

Increasingly, motor vehicles are being equipped with traction-controlled hydraulic brake systems. In disposing of vehicles that have been in accidents or are too old, however, there is no usable way of removing and disposing of the pressure medium contained in the brake system and especially in the hydraulic unit of the traction control system. In the case of the hydraulic unit, this is especially difficult because elecromagnetically actuatable valves are built into it, which when without current assume their blocking position and therefore make lines in the unit impassable. It is therefore the object of the invention to create an effective method for emptying the hydraulic unit that can be performed in a simple way.

SUMMARY OF THE INVENTION

The method of the invention is advantageously distinguished in that by simple aids, given a suitable long action time, adequate emptying of the pressure medium from the hydraulic unit is achieved. In particular, it is advantageous to use a permanent magnet, because under the rough operating conditions in a disposal facility, it would not be expedient to switch the valve over electromagnetically.

In accordance with one embodiment of the invention an accelerated and more-effective emptying of the hydraulic unit is attained, if valves are disposed in parallel lines and assume different switching positions.

In accordance with another feature of the invention, adequate emptying of the entire brake system is advantageously achieved.

Conversely, if pressure medium is to be eliminated from the hydraulic unit independently of the brake system, then in accordance with another feature, an additional advantage is achieved in that because of the closed lines, when the hydraulic unit is removed from the motor vehicle no pressure medium can escape and pollute the environment.

DESCRIPTION OF THE DRAWING

Two exemplary uses of the invention are described herein below an illustrated in simplified form in the drawings in which.

DESCRIPTION OF THE PREFERRED EMBODIMENTS

Figure 1:
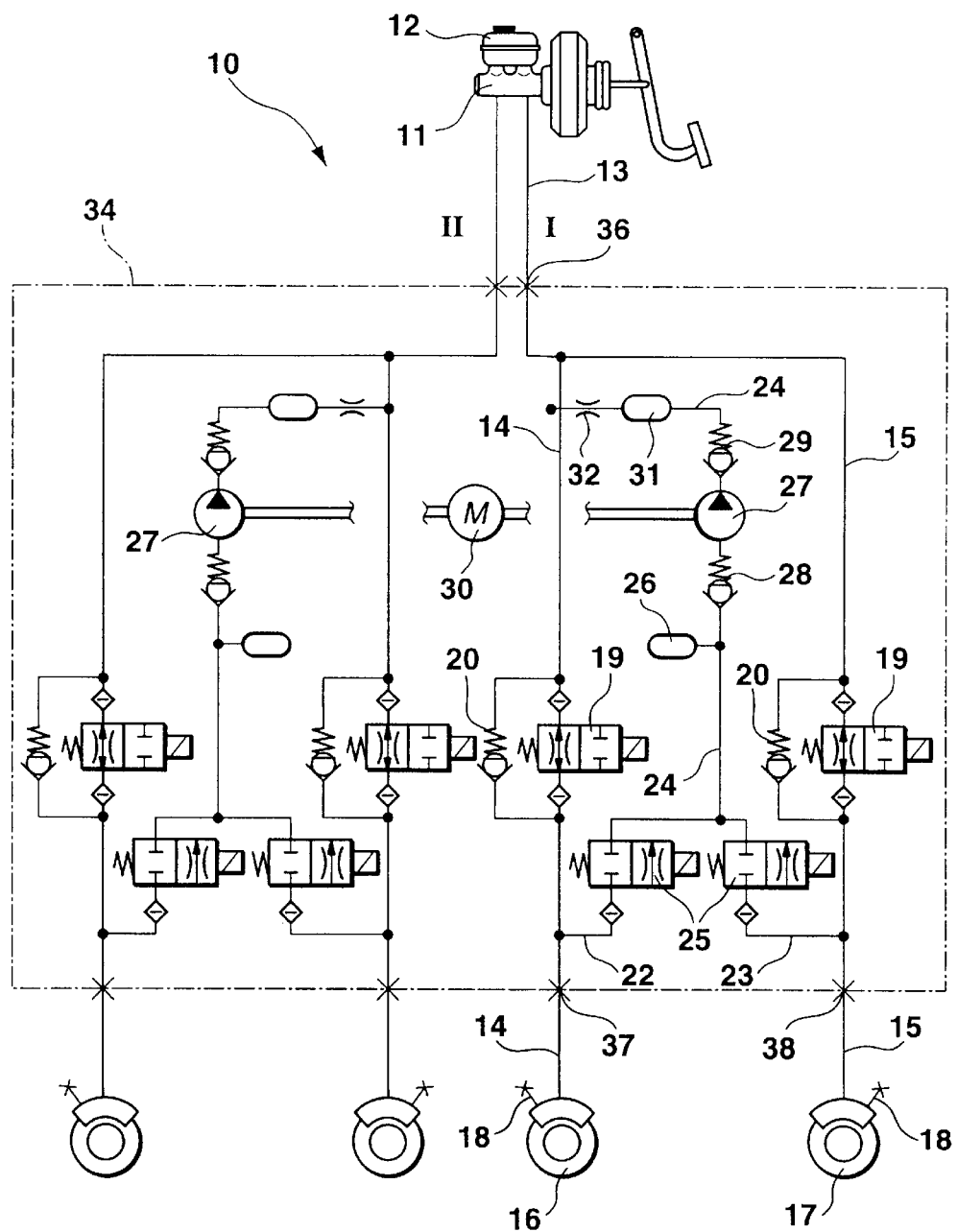
FIG. 1 shows a hydraulic circuit diagram of a traction-controlled brake system of a motor vehicle, having a hydraulic unit.

A traction-controlled hydraulic brake system 10 of motor vehicles has two brake circuits I and II (FIG. 1). Since the brake circuits I and II are equipped in the same way, elements present in a given brake circuit mentioned below will be identified by the same reference numeral. The Brake system 10 has a master cylinder 11 with a pressure medium supply container 12. Per brake circuit I and II, one brake line 13 leads away from the master cylinder 11 and branches into two brake lines 14 and 15, to each of which a respective wheel brake 16 and 17 is connected. The wheel brakes 16, 17 each have one venting screw 18. An electromagnetically actuatable valve, hereinafter called an inlet valve 19, is located in the brake lines 14 and 15; when spring-actuated, it assumes its open position, and when supplied with electric current, it assumes its blocking position. The inlet valve 19 is bypassed by a bypass valve 20 in the form of a spring-loaded check valve, which opens in the direction of the applicable wheel brake 16 and 17 toward the master cylinder 11.

Toward the wheel brakes, a respective return line 22 and 23 lead away from the brake lines 14 and 15; the return lines are combined into one common return line 24. This return line is connected to the brake line 14 toward the master cylinder. One electromagnetically actuatable valve, hereinafter called an outlet valve 25, is located in each return line 22 and 23, respectively; on spring actuation, it assumes its blocking position, while when electromagnetically actuated, it can be shifted to its open position. A pressure medium reservoir 26 is connected to the common return line 24. Following this reservoir in the direction of the master cylinder 11 in the return line 24 is a high-pressure pump 27, embodied as a piston pump, with a suction valve 28 and a compression valve 29. The suction valve 28 and the compression valve 29 are spring-loaded check valves, which open in the direction of the master cylinder 11. The high-pressure pumps 27 of the two brake circuits I and II can be driven by a common drive motor 30. The high-pressure pump 27 is followed in the return line 24 by a damper chamber 31 and a throttle restriction 32.

The mode of operation of the brake system 10 is known and therefore requires no further explanation.

Figure 4:
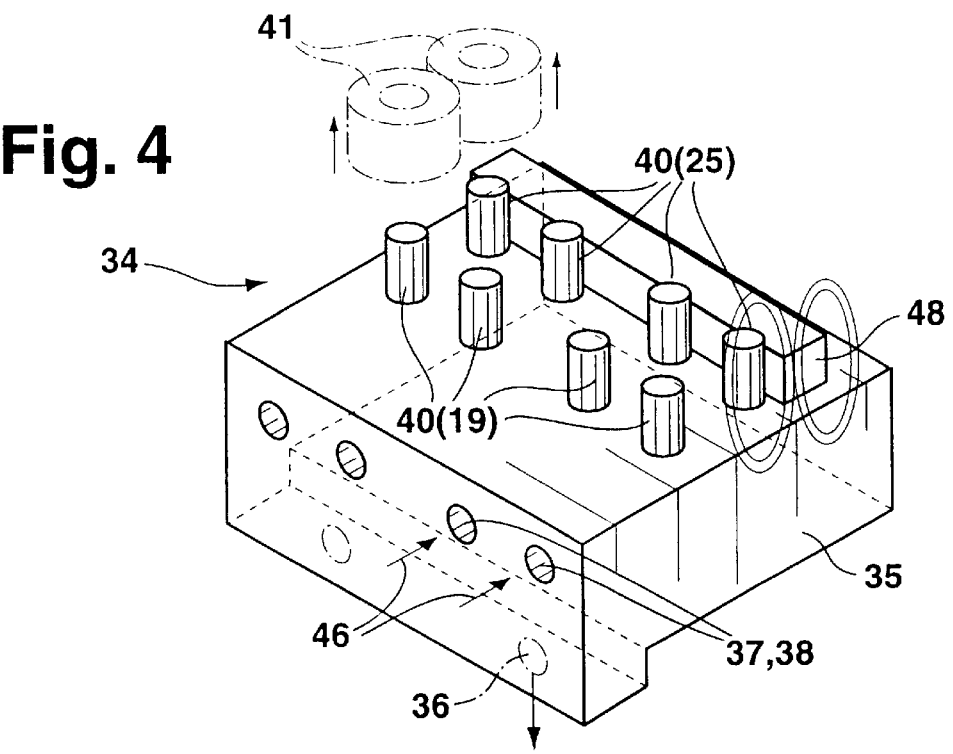
FIG. 4, on a larger scale, shows the hydraulic unit of the brake system with a permanent magnet mounted on it for switching over the valves.

The aforementioned elements of the brake system 10 that are located between the master cylinder 11 and the wheel brakes 16, 17 of the respective brake circuit I and II are united in a hydraulic unit 34, which is indicated by dot-dashed lines in FIG. 1. The hydraulic unit 34 has a valve block 35 (FIG. 4) with a connection 36 for the part of the brake line 13 toward the master cylinder of each brake circuit I and II, as well as connections 37 and 38 for the position toward the wheel brakes of the brake lines 14 and 15 (FIGS. 1 and 4). The valve block 35 includes the inlet valves 19, bypass valves 20, outlet valves 25, pressure medium reservoirs 26, high-pressure pumps 27 with suction valves 28 and compression valves 29, damper chambers 31 and throttle restrictions 32, including the parts of the brake lines 13, 14 and 15 that as described above connect these elements, as well as the return lines 22, 23 and 24 of the brake circuits I and II. Valve domes 40 of the inlet valves 19 and outlet valves 25 protrude out of the valve block 35; in a known manner, in each valve dome there is one pole core and one armature movable counter to spring force. In a manner not shown, a housing that can be placed on the valve block 35 fits over the valve domes 40, as known from European Patent Disclosure EP 0 752 941 B1. The housing can contain an electronic control unit for wheel slip control in the brake system 10, and electrical coils 41 which embrace the valve domes 40 are received in the housing. The coils 41 are removable from the valve domes 40 of the valves 19 and 25, as indicated by coils shown in dot-dashed lines in FIG. 4.

The brake system 10 is filled with pressure medium (brake fluid), which must be disposed of if the hydraulic unit 34 is removed, for example when an old vehicle is scrapped. According to the invention, two methods are possible for this: The valve block 35 of the hydraulic unit 34 is emptied of pressure medium either in the built-in state, together with the entire brake system 10, or after being removed from it.

Figure 2:
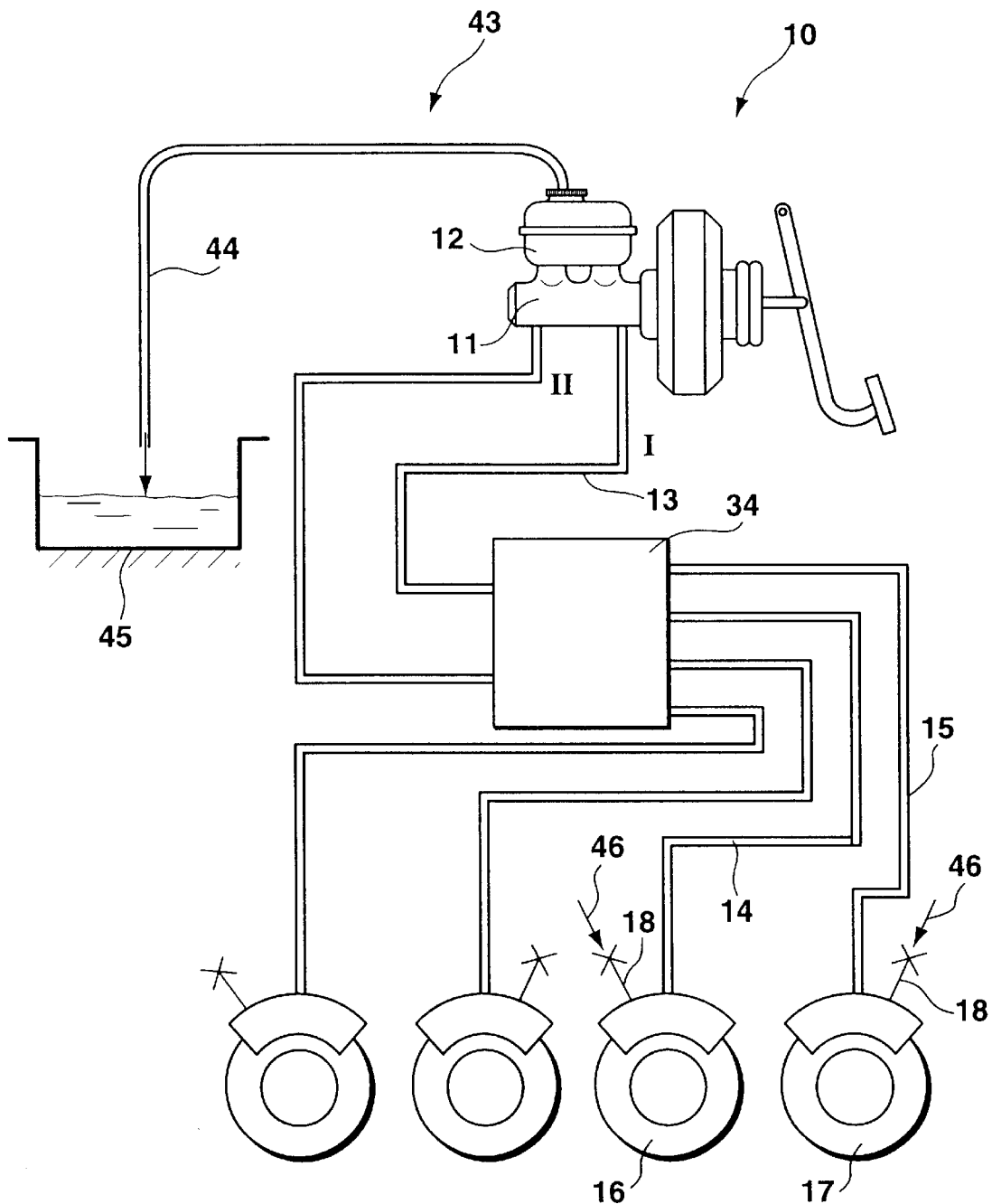
FIG. 2 schematically shows a brake system of a motor vehicle arranged for emptying pressure medium, as the first exemplary use.

In the first case, a removal device 43 in FIG. 2 is mounted at the fill opening of the pressure medium supply container 12 of the brake system 10. This device of the pressure medium supply container 12 of the brake system 10. This device includes a pipeline or hose 44, which connects the pressure medium supply container 12 to a container 45 for pressure medium, this container being independent of the vehicle. An air source, as indicated by arrows 46 in FIG. 2, is connected to the venting screws 18 of the wheel brakes 16, 17 of one brake circuit, such as I, or both brake circuits I, II. The air source must furnish a sufficiently high pressure to overcome the bypass valves 20, suction valves 28 and compression valves 29 when air is passed through the brake system 10. The air source will therefore be called the compressed-air source below.

For passing the air through the brake system 10, it is necessary for the outlet valves of the respective brake circuit I or II, or both brake circuits, which when unactuated assume their blocking position, to be shifted into their open position. According to the invention, this is done by removing the coils 41 of the outlet valves 25 from the respective valve dome 40, and placing a permanent magnet rod 48 against the valve domes (FIG. 4). The exertion of magnetic force of the permanent magnet rod 48 is dimensioned such that the magnetic field, schematically indicated in FIG. 4, attracts the armature against the pole core counter to spring force and switches the outlet valves 25 into the open position. Given a sufficiently long action time, the air introduced from the compressed-air source 46 at the venting screws 18 of the wheel brakes 16 and 17 is capable of positively displacing the pressure medium from the hydraulic unit 34 and the other parts of the brakes system 10 to the required extent, so that the parts of the brake system, and in particular the hydraulic unit, can be disassembled from the motor vehicle without polluting the environment and delivered elsewhere for further scrapping.

Figure 3:
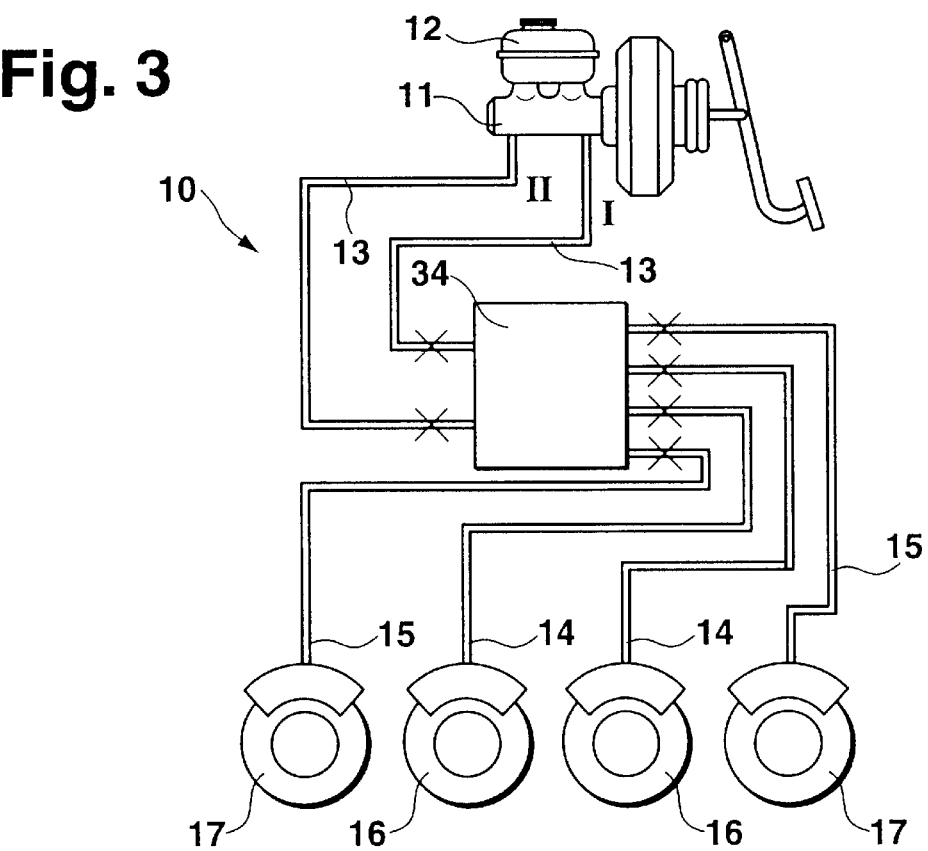
FIG. 3 schematically shows a brake system, prepared for removal of the hydraulic unit, of a motor vehicle as the second exemplary use.

In the second case, it is provided that the hydraulic unit 34 be removed from the pressure medium-filled brake system 10 and then emptied of pressure medium. To that end, in FIG. 3, the brake lines 13, 14 and 15, embodied as steel pipes, in the brake circuits I and II are severed near the hydraulic unit 34, at the severing points marked X. The remaining parts of the lines on both sides of the respective severing point X are closed in pressure medium-tight fashion in the process. The hydraulic unit 34, which can now be removed from the motor vehicle, is expediently received in a device, not shown, for retaining an catching pressure medium. The parts of the line are removed, so that the connections 36, 37 and 38 of one or both brake circuits I, II are exposed. The housing containing the electrical coils 41 is pulled off the valve block 35, as is known from the aforementioned reference EP 0 752 941 B1. The compressed-air source 46 is placed directly against the connections 37 and 38 of the valve block 35. The outlet valves 25 are switched to their open position by means of the permanent magnet rod 48, and compressed air is fed into the valve block 35. The pressure medium positively displaced from the valve block 35, together with air emerging from the connection 35, reaches the catching device, in which the pressure medium is caught and the air, optionally cleaned, is emitted to the environment. This averts any risk to the health of the workers involved.

The method of the invention for emptying the pressure medium from the hydraulic unit 34 can be refined by providing that when compressed air is passed through the valve block 35, the outlet valves 25 initially remain in their blocking position, and the compressed air positively displaces the pressure medium out of the brake lines 14 and 15 with the inlet valves 19 located in them, which inlet valves assume their open position when unactuated. Next, by means of the permanent magnet rod 48, the outlet valves 25 are switched to their open position. With the same permanent magnet rod 48 or with a second permanent magnet rod (not shown), the inlet valves 19 are also switched to their blocking position. As a result, a greater resistance is presented to the compressed air in the brake lines 14 and 15, which contributes to more-effective emptying of the pressure medium from the return lines 22, 23 and 24 along with the associated elements of the brake system 10.

If a different design of the high-pressure pumps 27 permits, the compressed air can also, in a departure from the exemplary uses described above, be introduced into the hydraulic unit 34 at the connection 35 as well.

The foregoing relates to preferred exemplary embodiment of the invention, it being understood that other variants and embodiments thereof are possible within the spirit and scope of the invention, the latter being defined by the appended claims.

We claim:

1. A method for emptying the pressure medium from a hydraulic unit (34) of a hydraulic brake system (10) of motor vehicles, in which the hydraulic unit (34) has connections (36, 37, 38) for brake lines (13, 14, 15), which lines (13, 14, 15) connect the hydraulic unit to a master cylinder (11) with a pressure medium supply container (12) and also to wheel brakes (16, 17), the hydraulic unit having at least one valve (25), which is actuatable by exertion of magnetic force and which has a removable electrical coil (41), said at least one valve (25), when unactuated, assumes a blocking position, comprising the following method steps:

removing the electrical coil (41) from the at least one valve (25);

connecting the hydraulic unit (34) to an air source (46) of adequately high pressure;

switching the at least one valve (25) to an open position by the exertion of magnetic force from a permanent magnet (48);

wherein air is carried from an air source (46) through the hydraulic unit (34); and the pressure medium contained in the hydraulic unit (34) is positively displaced by the air from the air source (46) and caught.

2. The method of claim 1, wherein the hydraulic unit (34) has at least one other valve (19) with a removable electrical coil (41), the at least one valve (25) and the at least one other valve (19) being actuatable by exertion of magnetic force and are located in lines (14, 15, 22, 23) extending parallel to one another, of which valves the at least one valve (25), when unactuated assumes its blocking position and is located in one line (22, 23), while the at least one other valve

(19) is disposed in a line (14, 15) extending parallel to the one line (22, 23) and when unactuated assumes an open position, wherein the other valve (19), while air is being passed through the hydraulic unit (34), is switched at least intermittently into a blocking position by the exertion of magnetic force of the permanent magnet (48).

3. The method of claim 2, wherein during the passage of air through the hydraulic unit (34), the valves (19, 25) initially remain in their unactuated positions.

4. The method of claim 3, wherein the hydraulic unit (34) is left in the motor vehicle and the air is delivered from the air source (46) to the wheel brakes (16, 17), and wherein the positively displaced pressure medium is removed from the pressure medium supply container (12) of the master cylinder (11).

5. The method of claim 3, wherein the brake lines (13, 14, 15) which connect the hydraulic unit (34) to the master cylinder (11) and to the wheel brakes (16, 17) are closed in pressure medium-tight fashion and severed, and wherein the hydraulic unit (34) is removed from the motor vehicle and made to communicate with the air source (46) and connected to a device for catching pressure medium.

6. The method of claim 5, wherein the catching device is a container (45), in which the pressure medium positively displaced from the hydraulic unit (34) is caught and then the air source (46) is disconnected and carried away.

7. The method of claim 2, wherein the hydraulic unit (34) is left in the motor vehicle and the air is delivered from the air source (46) to the wheel brakes (16, 17), and wherein the positively displaced pressure medium is removed from the pressure medium supply container (12) of the master cylinder (11).

8. The method of claim 2, wherein the brake lines (13, 14, 15) which connect the hydraulic unit (34) to the master cylinder (11) and to the wheel brakes (16, 17) are closed in pressure medium-tight fashion and severed, and wherein the hydraulic unit (34) is removed from the motor vehicle and made to communicate with the air source (46) and connected to a device for catching pressure medium.

9. The method of claim 8, wherein the catching device is a container (45), in which the pressure medium positively displaced from the hydraulic unit (34) is caught and then the air source (46) is disconnected and carried away.

10. The method of claim 1, wherein the hydraulic unit (34) is left in a motor vehicle and the air is delivered from the air source (46) to the wheel brakes (16, 17), and wherein the positively displaced pressure medium is removed from the pressure medium supply container (12) of the master cylinder (11).

11. The method of claim 1, wherein the brake lines (13, 14, 15) which connect the hydraulic unit (34) to the master cylinder (11) and to the wheel brakes (16, 17) are closed in pressure medium-tight fashion and severed, and wherein the hydraulic unit (34) is removed from the motor vehicle and made to communicate with the air source (46) and connected to a device for catching pressure medium.

12. The method of claim 11, wherein the parts of the severed brake lines (13, 14, 15) that belong to a brake circuit (I, II) of the brake system (10) are removed, and the air source (46) is connected directly to the hydraulic unit (34).

13. The method of claim 12, wherein the air source (46) furnishes a pressure of such a magnitude that check valves (20, 28, 29) located in the brake circuit (I, II) are overcome.

14. The method of claim 11, wherein the catching device is a container (45), in which the pressure medium positively displaced from the hydraulic unit (34) is caught and then the air source (46) is disconnected and carried away.

15. The method of claim 1, wherein the air source (46) furnishes a pressure of such a magnitude that check valves (20, 28, 29) located in the brake circuit (I, II) are overcome.

\* \* \* \* \*